Feb. 21, 1956 M. T. GOETZ 2,735,887

CHARACTER SEQUENCE TRANSMITTER

Filed Jan. 11, 1952 4 Sheets-Sheet 1

INVENTOR
MAURUS T. GOETZ
BY Emery Robinson
ATTORNEY

CHARACTER SEQUENCE TRANSMITTER

Filed Jan. 11, 1952 4 Sheets-Sheet 2

INVENTOR
MAURUS T. GOETZ
BY Emery Robinson
ATTORNEY

CHARACTER SEQUENCE TRANSMITTER

Filed Jan. 11, 1952 4 Sheets-Sheet 3

INVENTOR
MAURUS T. GOETZ
BY Emery Robinson
ATTORNEY

CHARACTER SEQUENCE TRANSMITTER

Filed Jan. 11, 1952 4 Sheets-Sheet 4

INVENTOR
MAURUS T. GOETZ
BY Emery Robinson
ATTORNEY

United States Patent Office 2,735,887

Patented Feb. 21, 1956

2,735,887

CHARACTER SEQUENCE TRANSMITTER

Maurus T. Goetz, Chicago, Ill., assignor to Teletype Corporation, Chicago, Ill., a corporation of Delaware Application January 11, 1952, Serial No. 265,953

26 Claims. (Cl. 178—17)

This invention relates to a character sequence transmitter and more particularly to a sequentially operated device for effectuating the transmission of a preconcerted succession of permutated telegraph signals.

In operation of telegraph systems, it often becomes necessary to transmit a predetermined sequence of signals through the system to apprise various outlying or transmitting stations of certain information. Such predetermined signals are utilized in various ways, for example, as answer back signals generated by an outlying receiving station to inform a transmitting station that an address portion of a message directed to that receiving station has been properly routed through a switching center and that the apparatus at the receiving station has received the address portion of the message and further that the apparatus has been conditioned for the reception of the body of the message. These answer back signals are of paramount importance for checking the proper functioning of switching centers which perform switching operations in response to the address portion of a message because there often arises errors in the generation, transmission or reception of the address portion of the message either by the operators or by the loss of signals in the generating apparatus or in the transmission medium.

The pertinency of generating a preconcerted succession of preconcerted signals also manifests itself in the situation wherein it is desirable to identfy messages originating at a transmitting station by some form of an identification code. These preconcerted permutated signals are utilized to inform receiving stations of the identity of the originating station of each message.

It is a primary object of this invention to provide a mechanically operated signal generator for producing a predetermined sequence of telegraph signals.

It is another object of this invention to provide a sequential transmitter which upon being initiated into operation automatically continues to operate until a preconcerted sequence of telegraph signals are transmitted.

A further object of this invention is the provision of transmitting apparatus which may be selectively operated to transmit various preselected sequences of message or address telegraph signals.

A more specific object of the invention resides in the provision of a series of successively operated gating or latching devices for controlling the successive operation of a series of code bars to effectuate the generation of a series of preconcerted telegraph signals.

With these and other objects in view the present invention contemplates a signal generator which is controlled in its operation by the permutated setting of a plurality of notched selector bars. The permutated positions assumed by the selectors bars are controlled through the instrumentality of a series of coded bars which individually overly each aligned row of notches in the selector bars. Each coded bar is retained from moving into position to control the selector bars by individual latching or gating devices associated with each coded bar. A selectively operated control circuit is provided to operate a solenoid to unlatch the first latching device associated with the first coded bar in a series of coded bars whereby the first coded bar is permitted to move into position to control the permutated setting of the selector bars. Each coded bar is provided with a permutation of projections thereon which are indicative of a signal to be transmitted and when the permutated projections are positioned within an aligned row of notches in the selector bars subsequent movement of the selector bars allows only those selector bars not blocked by the permutated projections on the coded bars to move into operative position to control the signal generator. The movement of the first coded bar conditions the next successive gating or latching device for operation which upon the completion of a generation of a signal is released to permit the second coded bar in the series of coded bars to move into position to control the selector bars. The remainder of the coded bars are moved into position to control the selector bars in a like manner; that is, upon the operation of a preceding coded bar in the series, the next succeeding latch or gating device is conditioned to operate upon the completion of the generation of a signal in accordance with the permutated projections on the preceding coded bar. An additional feature of the invention resides in providing a plurality of solenoids which may be selectively operated to start the sequential operation of the coded bars at various positions in the series of coded bars to cause the signal generator to generate various sequences of preconcerted signals.

Other objects and advantages of the present invention will be apparent from the following detailed description, when considered in conjunction with the accompanying drawing wherein.

Figures 1, 2:
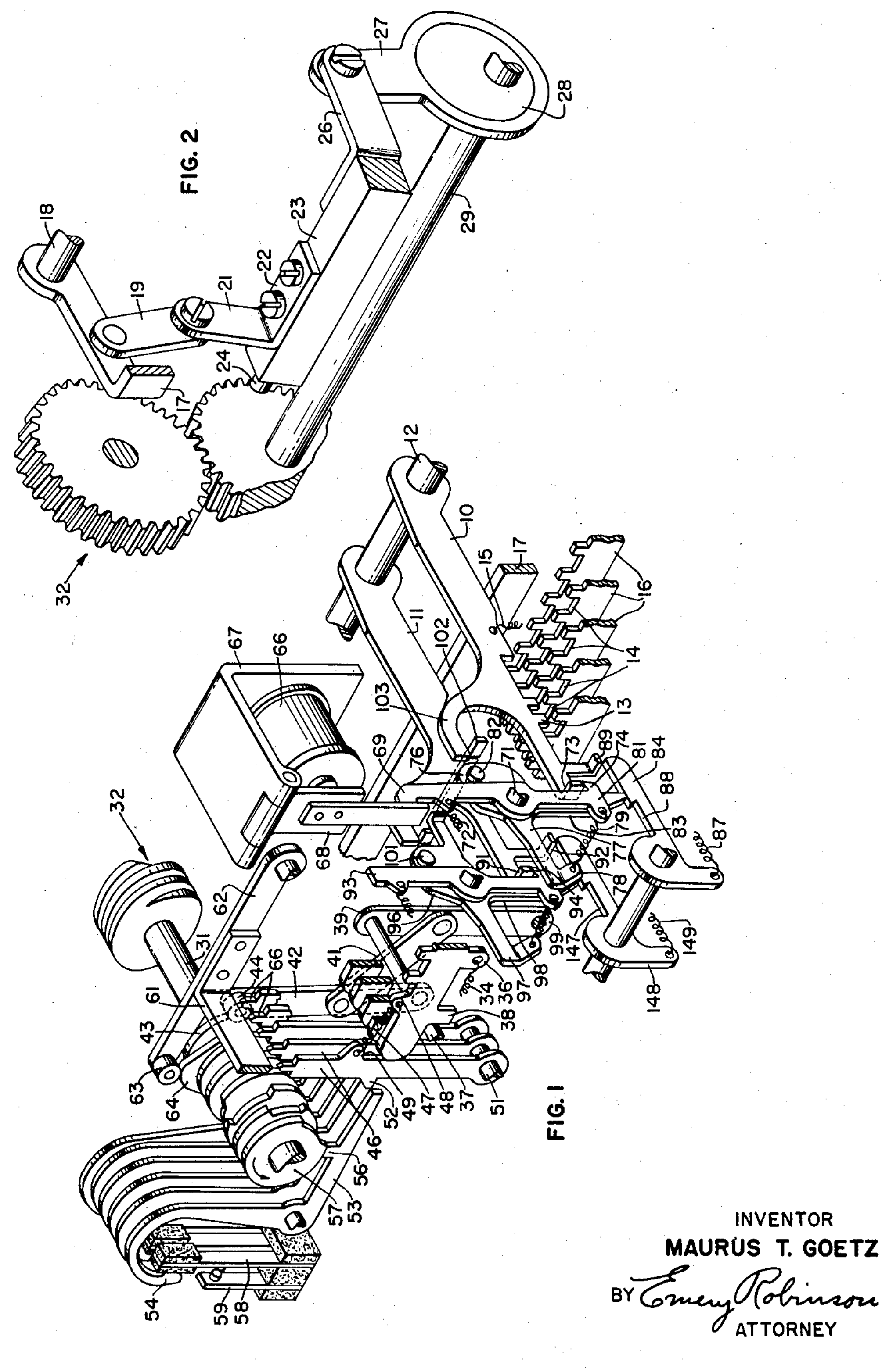
Fig. 1 is a perspective view partially broken away to illustrate the principal elemental parts of a character sequence transmitter embodying the principal features of the invention.
Fig. 2 is a perspective view of an operating bail for controlling the coded bars shown in Fig. 1.

Referring to the drawings and more particularly to Fig. 1, there are shown two coded bars 10 and 11 of a series of coded bars which are pivotaly mounted about a fixed rod 12. Each coded bar is provided with a plurality of permutated projections 13 which are indicative of a permutated signal to be transmitted. In Fig. 1 only the coded bar 10 is shown as having permutated projections thereon but it is to be understood that each and every other coded bar, such as the coded bar 11, is provided with distinct series of permutated projections which are indicative of different preconcerted signals which are to be transmitted. Each coded bar overlies a row of aligned notches 14 formed in a series of selector bars 16 and is urged into an aligned row of notches by tension springs 15 individually connected to each coded bar. The projections 13 on each of the coded bars are maintained from position within the respective aligned rows of notches through the instrumentality of a stripper bail 17 formed in a U-shape and pivotally mounted about a fixed pivot shaft 18 as shown in Fig. 2.

The stripper bail 17 is maintained in a raised position by means of a linkage comprising a link 19 pivotally connected to one arm of the stripper bail 17 and pivotally connected at its other end to an upwardly extending arm 21 of an L-shaped bracket 22 secured to a block member 23. The block member 23 has mounted in either extremity thereof, a trunnion 24 positioned within bearings mounted within the frame of apparatus( not shown). Connected to the cross member 23 is a second L-shaped bracket 26 having its extending arm pivotally connected to a yoke member 27. Positioned within the yoke 27 is an eccentric cam 28 securely mounted on an auxiliary power shaft 29. The auxiliary power shaft 29 is supplied with rotative power from a main power shaft 31 by means of a gear train 32.

Figure 3:
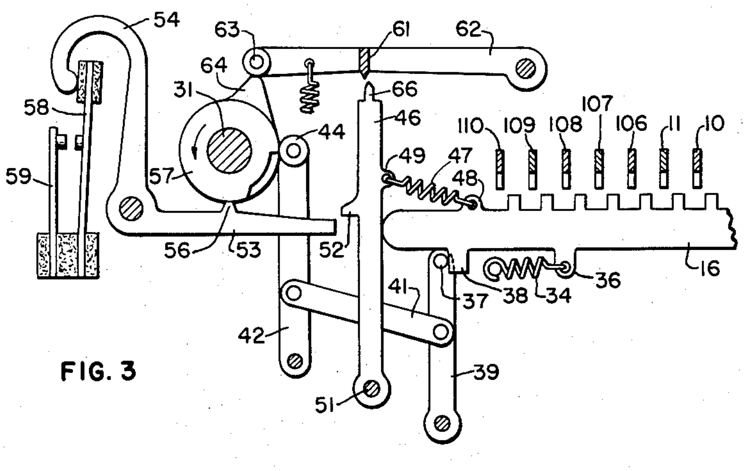
Fig. 3 is a side elevational view of the signal generator shown in the left hand portion of the Fig. 1.

Returning now to a consideration of the selector bars 16, they are urged towards the left as viewed in Figs. 1 and 3 by the springs 34 connected to ears 36 formed on the underside of the selector bars 16. The selector bars 16 are maintained in a rightward position, as viewed in Fig. 1, against the action of the springs 34 through the instrumentality of a holding rod 37 which engages a projection 38 formed on the underside of each of the selector bars 16. Each end of the holding rod 37 is mounted within a rock arm 39 (see Figs. 1, 3, and 5), Holding one of the rock arms 39, in position, is a link 41 which pivotally interconnects the rock arm 39 with a cam follower arm 42. Controlling the position of the cam follower arm 42 is a cam 43 mounted on the main power shaft 31 to engage a roller 44 rotatively mounted on the cam follower arm 42.

Each selector bar 16 is held in abutting relationship with a blocking lever 46 by means of springs 47 interconnecting ears 48 formed on the selector bars 16 and ears 49 formed on the blocking levers 46. The blocking levers 46 are each pivotally mounted about a shaft 51, consequently any movement of the selector bars 16 is transferred to its respective blocking levers 46 to move projections 52 formed thereon into position to overly a series of trailing arms 53, each of which forms an integral part of a goose neck transmitting lever 54. Formed on each trailing arm 53 is an abutment 56 adapted to act as a follower of a group of transmitting cams 57 securely mounted on the main power shaft 31. The transmitting cams 57 are sequentially grooved in such a manner that counterclockwise rotation of the main power shaft 31 causes a groove in each transmitting cam 57 to be sequentially presented to the abutments 56 formed on the trailing arms 53 of the goose neck transmitting levers 54. As shown in Fig. 1 all of the abutments 56 are riding on the high portions of the cams 57 to hold the goose neck levers 54 against the action of a plurality of spring contacts 58 whereby these contacts are spaced from fixed spring contacts 59 (see Figs. 1 and 3). The spring contacts 58 are normally biased to engage with the fixed spring contacts 59 and as a consequence exert a force on the goose neck levers 54 tending to hold the abutments 56 in engagement with the peripheries of the transmitting cams 57.

A locking device is provided for holding the blocking levers 46 in their permutated position which comprises a U-shaped lock bar 61. One arm of the lock bar 61 is secured to a pivotally mounted follower arm 62 having a follower roller 63 mounted on its free end. The follower roller 63 is adapted to follow a cam 64 mounted on the main power shaft 31. In the unoperated position, such as shown in Figs. 1 and 3, the cam 64 raises the follower roller 63 to hold the lock bar 61 spaced from a plurality of projections 66 formed on the blocking levers 46.

Figure 4:
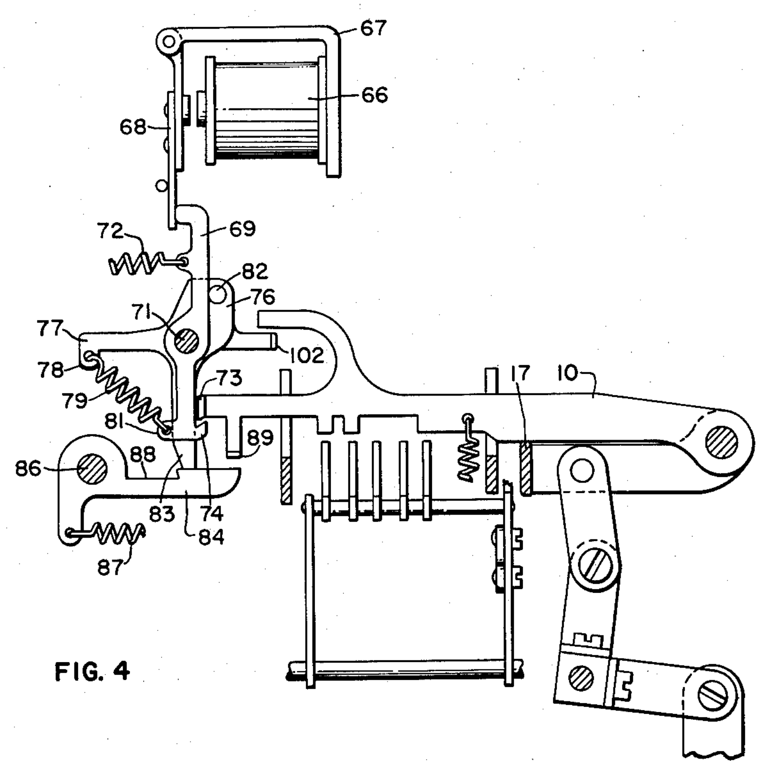
Fig. 4 is a side elevational view of a coded bar together with a latching mechanism.

Referring now to Figs. 1 and 4, there is shown a solenoid 66 secured to a bracket 67 mounted on the frame of the apparatus. Pivotally mounted on the bracket 67 is an armature 68 adapted to cooperate with one extremity of a trip latch 69. Urging the trip latch 69 to pivot about a shaft 71 is a spring 72 but the effect of the spring 72 is limited since the lower extremity of the trip latch 69 engages the front face of a bent over detent 73 formed on the forward end of the coded bar 10. The underside of the bent over detent 73 is beveled to provide a latching surface which is spaced from but adapted to cooperate with a beveled notch formed in a protruding portion 74 of the lower extremity of the trip latch 69. Pivotally mounted on the shaft 71 is a multi-arm member 76 having one arm 77 thereof provided with an eye 78 for the purpose of accommodating a tension spring 79. Spring 79 is extended to engage an eye 81 formed on the lower extremity of the trip latch 69. Relative movement between the multi-arm member 76 and the trip latch 69 is prevented by a stud 82 formed on the multi-armed member 76 in such a manner as to engage the trip latch 69.

A second arm 83 of the multi-armed member 76 extends downwardly to engage a pivotally mounted latch 84. Latch 84 is urged about a shaft 86 by a spring 87 to bring the latch 84 into abutting relationship with the extremity of the arm 83. The latch 84 is provided with a beveled notch 88 for the purpose of accommodating the extremity of the arm 83 when said arm is pivoted in a clockwise direction. Positioned above the latch 84 is a bent over detent 89 formed integral with the coded bar 10.

Referring to Fig. 1, the second coded bar 11 is shown as being associated with a latching arrangement substantially identical with that described in regard to the latching arrangement associated with the coded bar 10. The coded bar 11 is provided with a bent over latching detent 91 and a second bent over detent 92 identical to the detents 73 and 89 of the coded bar 10. The latching device associated with the coded bar 11 comprises a trip latch 93 having a protruding portion 94 having formed therein a beveled notch spaced from but adapted to cooperate with the bent over detent 91. A multi-armed member 96 is pivotally mounted on the shaft 71 and has a pair of arms 97 and 98 identical to the arms 77 and 83, respectively, of the multi-armed member 76. Again a spring 99 is provided to extend between eyes formed on the arms 97 and 98 to urge the trip latch 93 into engagement with a stud 101 formed on the multi-armed member 96. In addition the multi-armed member 96 is provided with a bent over elongated bar 102 which extends over to and underneath a furcation 103 formed on the coded bar 10.

Figure 5:
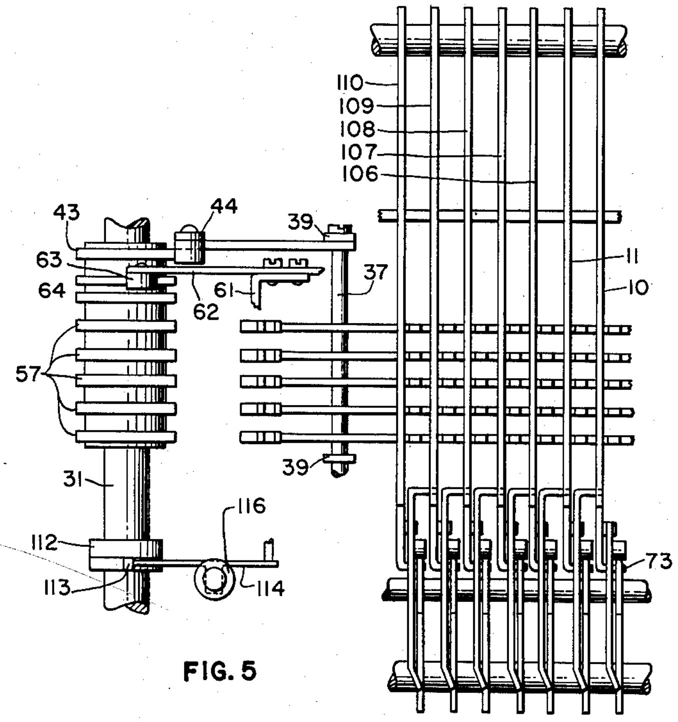
Fig. 5 is a top plan view of a series of the coded bars and the latching mechanisms therefor together with a portion of the signal generating means.

Referring to Fig. 5, which is a top plan view of the apparatus, there are shown a plurality of additional coded bars 106, 107, 108, 109, and 110 identical to the coded bars 10 and 11 and associated with each one of these coded bars is a latching device identical to the latching device as previously described in association with the coded bar 11. Also disclosed in Fig. 5 is a clutch 112 mounted on the main power shaft 31. This clutch may be of a friction disc type or any other type such as disclosed in the A. N. Nilson et al. Patent 2,568,249 dated September 18, 1951. The only requirement for such clutch being that it be capable of rapid engagement and disengagement. The clutch is provided with an operating dog 113 which is engaged by a pivotally mounted armature 114 to hold the clutch disengaged. Associated with the armature 114 is a solenoid 116 which upon energization withdraws armature 114 from engagement with the dog 113 to thereby permit power to be delivered along the shaft through the clutch 112 to the main power shaft 31.

Figure 6:
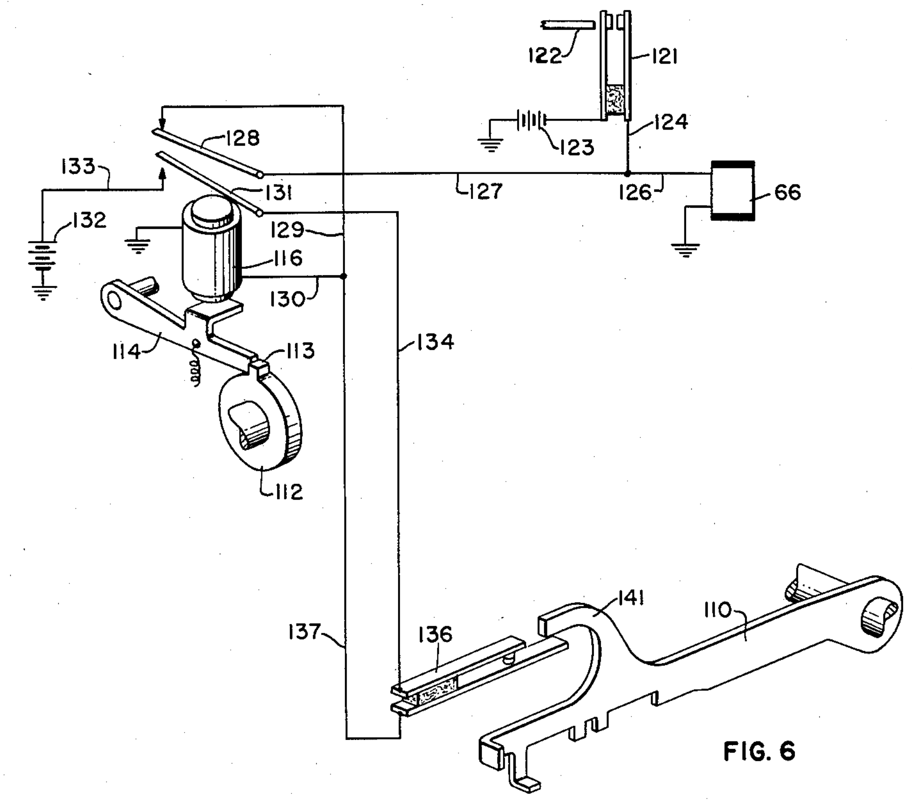
Fig. 6 is a circuit diagram together with a coded bar and a clutch illustrating the means for initiating and stopping the transmission of a sequence of signals.

The control circuit for operating the above described apparatus is illustrated in Fig. 6 and comprises a normally open contact 121 which may be closed by either means associated with a transmitter or with a receiver depending upon whether the apparatus is to be used as a message identification transmitter or as an answer back transmitter. In either case, a lever 122 would be operated by the transmitter or receiver to close contact 121 to complete a circuit from ground to battery 123, through the now closed contact 121, over a lead 124, over a lead 126 and thence through the solenoid 66 to ground. A circuit may be also traced from energized lead 124, over a lead 127, through a normally closed armature 128, over a lead 129, over a lead 130, through the solenoid 116 to ground. Energization of the solenoid 116 draws up an armature 131 to complete a locking circuit for the solenoid 116 which may be traced from ground through a battery 132, over a lead 133, through the now drawn up armature 131, over a lead 134, through a normally closed spring contact 136, over a lead 137, over the lead 130, and through the solenoid 116 to ground. The spring contact 136 has one of its contact elements extending over and spaced from a furcation 141 formed on the coded bar 110. This arrangement provides a means whereby the energized circuit may be interrupted following the operation of the last coded bar 110. It is to be also noted that the energization of the solenoid 116 draws up the armature 128 and thus when the contact 121 is opened the solenoid 66 is de-energized. Energization of the solenoid 116 also draws up the armature 114 to allow the clutch 112 to supply rotative power to the main power shaft 31.

In operation of the character sequence transmitter, a momentary impulse is supplied to the solenoid 66 by closing the spring contact 121. Energization of the solenoid 66 draws up its armature 68 to withdraw the protruding portion 74 of the trip latch 69 from beneath the detent 73. Closure of the spring contact 121 also supplies an energization impulse to the clutch solenoid 116 which as heretofore described draws up its armature 131 to complete its locking circuit (Fig. 6). Energization of the solenoid 116 also draws up its armature 114 and hence the armature 114 moves from engagement with the dog 113 of the clutch 112. Counterclockwise rotative power is supplied to the driving portion of the clutch 112 from any suitable source such as a constantly rotating electrical motor. The main power shaft 31 is thereupon rotated in a counterclockwise direction to impart rotative movement through the gear train 32 to the auxiliary power shaft 29 (Figs. 1 and 2). Rotation of the shaft 29 through the instrumentality of the eccentric cam 28 causes the block 23 to oscillate about its trunnions 24. Movement of the block member 23 in a clockwise direction as viewed in Fig. 2 causes bracket 21 to exert a force on the link 29 to pivot the stripper bail 17 about the pivot shaft 18 in a counterclockwise direction. Counterclockwise movement of the stripper bail 17, which normally holds the coded bars 10, 11, and 107 to 110, inclusive, from being positioned within the aligned rows of slots 14, results in all of these coded bars tending to move downwardly under the impetus of the springs 15 into the aligned rows of notches 14, however, movement of all the coded bars except coded bar 10 is prevented by the protruding portions of the respective trip latches engaging the beveled detents formed on the coded bars.

Returning now to a consideration of the movement of the trip latch 69, it is to be noted that such movement is imparted to the multi-armed member 76 through the stud 82. Movement of the multi-armed member 76 in a clockwise direction as viewed in Fig. 1 moves the arm 83 over the beveled notch 88 formed in the latch 84. The latch 84 immediately moves upward under the influence of the spring 87 to latch the arm 83 in position. The effect of this latching operation is to apply the force of the spring 79 to hold the latch arm 69 in engagement with the stud 82. The effect of the extended spring 79 is much greater than the effect of the tension spring 72, therefore, when the solenoid 66 is de-energized the trip latch 69 will remain in its withdrawn position to permit the coded bar 10 to move past the protruding portion 74 to a position within an aligned row of notches 14 formed in the selector bars 16.

The roller 44 now moves from the high spot on the cam 43 to pivot the cam follower arm 42 in a counterclockwise direction, and as previously indicated, movement of the cam follower arm 42 is imparted to the rock arm 39 through the instrumentality of the link 41. Counterclockwise movement of the rock arm 39 allows the selector bars to move towards the left as viewed in Figs. 1 and 3 under the influence of the extended springs 34, however, all of the selector bars are not moved to the left hand position since the permutated projections 13 on the coded bar 10 engage the projections formed on the selector bars 16 to permutatively block the selector bars in accordance with the permutation of the projections 13 on the coded bar 10. The unblocked selector bars move under the action of the extended springs 34 to move the blocking levers 46 towards the left as viewed in Figs. 1 and 3, thereby positioning a permutation of the projections 52 in an overlying relationship to the trailing arms 53 of the goose necked levers 54.

Upon the attainment of the selector bars in the permutated position, the follower roller 63 moves from the lobed portion of the cam 64 to pivot the follower arm 62, and as a consequence, the U-shaped lock bar 61 is moved between the permutatively positioned projections of the blocking levers 46 to thereby lock the blocking levers 46 in a permutated selection. Immediately following this operation, the notched portions of the transmitting cams 57 are sequentially brought into position above the abutments 56 whereupon the unblocked trailing arms 53 are moved in a counterclockwise direction to position the abutments 56 within the recessed portions of the transmitting cams 57, however, the blocking levers 46 which have been moved to position their projections 52 over the trailing arms 53 prevent any movement from being imparted to these trailing arms. Counterclockwise movement of the trailing arms 53 and goose necked levers 54 permit the respective spring contacts 58 to move into engagement with the stationary spring contacts 59. It may be therefore appreciated that the permutated projections on the coded bar 10 have controlled the movement of selector bars and the blocking levers 56 and ultimately the movement of the goose neck levers 54 to control the spring contacts 58 and 59 whereby said spring contacts are permutatively closed in accordance with the permutated projections 13 on the coded bar 10. It is understood by those skilled in the art that the contacts 58 and 59 are included within a transmitting circuit; therefore, a permutative series of impulses may be transmitted in accordance with the permutative closure of the spring contacts 58 and 59.

Returning now to a further consideration of the downward movement of the coded bar 10, the coded bar 10 upon being fully positioned within an aligned row of notches 14 moves the detent 89 into engagement with the latch 84 to thereby trip this latch and allow the spring biased trip latch 69 to move the multi-armed member 76 back to its original position as shown in Fig. 4.

Downward movement of the coded bar 11, resulting from the movement of the stripper bail 17, is arrested when the beveled surface of the detent 91 engages within the beveled notch formed in the protruding portion 94 of the trip latch 93. Detents formed on the other coded bars 106 to 110 also arrest movement of these coded bars by engagement with associated protruding portions of identical trip latches. This arresting of the movement of these other coded bars, prevents the permutated projections thereon from becoming positioned within aligned rows of notches 14 formed in the selector bars 16 and as a result these other coded bars are ineffective to control the permutated positioning of the selector bars 16.

Another operation is performed by the movement of the coded bar 10; namely, the movement of the furcation 103 into engagement with the elongated bar 102 connected to the multi-armed member 96. This engagement does not occur until after the detent 91 and the identical detents on the other coded bars are engaged within the beveled notches formed within the protruding portion 94 of the trip latch 93 and identical elements associated with the other coded bars 106–110. Movement of the furcation 103 is imparted to the elongated bar 102 to pivot the multi-armed member 96 in a counterclockwise direction to extend the spring 99 interconnecting the trip latch 93 and the arm 97. This extension of the spring 99 continues until the arm 98 is positioned over a beveled notch 147 formed in a latch 148 which is identical to the latch 84. The latch 148 is thereupon pivoted under the impetus of its spring 149 to engage the arm 98 within the beveled notch 147. Manifestly, since the detent 91 holds the trip latch 93 stationary by reason of the engagement of the detent within the beveled notch formed in the protruding portion 94 of the trip latch 93, the latching mechanism is in effect cocked by the extension of the spring 99.

Upon completion of the generation of a permutated signal the various elements are returned to their initial position. This is accomplished by the cam 64 moving its lobed portion into engagement with the roller 63 whereupon the U-shaped lock bar 61 is withdrawn from its locking position between the projections 66. Immediately thereafter the cam 43 moves the follower arm 42 and hence the holding bar 37 in a counterclockwise direction to return all of the selector bars 16 to the initial position. The eccentric cam 28 is now moved to cause the stripper bail 17 to move upwardly to lift all of the coded bars 10, 11, 106 to 110, inclusive, thereby moving the latching detents from engagement with the beveled notches formed in the protruding portions of the respective trip latches. Movement of the detent 91 from within the beveled notch in the protruding portion 94 of the trip latch 93 immediately permits the trip latch 93 to pivot in a clockwise direction under the influence of the extended spring 99. It may be therefore readily understood that subsequent downward movement of the stripper bail 17 effectuates the movement of the coded bar 11 within an aligned row of notches 14 formed in the selector bars 16 to control the position of the selector bars 16 in accordance with the permutated projections formed on the coded bar 11.

Each of the other coded bars 106 to 110, inclusive, have similar latching arrangements associated therewith and as a consequence, these coded bars are sequentially and successively positioned within aligned rows of notches 14 to control the permutated positions assumed by selector bars 16 to thereby permutatively close the contacts 58 and 59 in accordance with the permutations of projections formed on the coded bars 106 to 110, inclusive.

Referring now to Fig. 6, the last coded bar 110 in the series is shown with its furcation 141 overlying a contact element of the contact 136. Movement of the coded bar 110 into an aligned row of notches 14 causes the furcation 141 to engage the contact element and open the contact 136 to break the energized circuit of the clutch solenoid 116. The de-energization of the solenoid 116 permits the armature 114 to move into position to engage the dog 113 of the clutch 112 and as a result the clutch 112 is disengaged to preclude the transmission of any further rotative power from the electric motor to the main power shaft 31 and therefore the apparatus comes to a stop. It is to be noted that the contact 136 is not opened until the coded bar 110 is positioned within an aligned row of notches 14 and therefore the apparatus will continue to function because the dog 113 has already passed the armature 114, thus permitting a partial rotation of the clutch 112 to bring the dog 113 into engagement with the armature 114. This movement of the clutch 112 and the power shaft 31 subsequent to the opening of the contact 136 is sufficient to permutatively position the selector bars 16 and move the transmitting cams 57 through their cycle of operation to complete the generation of the signals by the permutative closing of the contacts 58 and 59.

Figure 7:
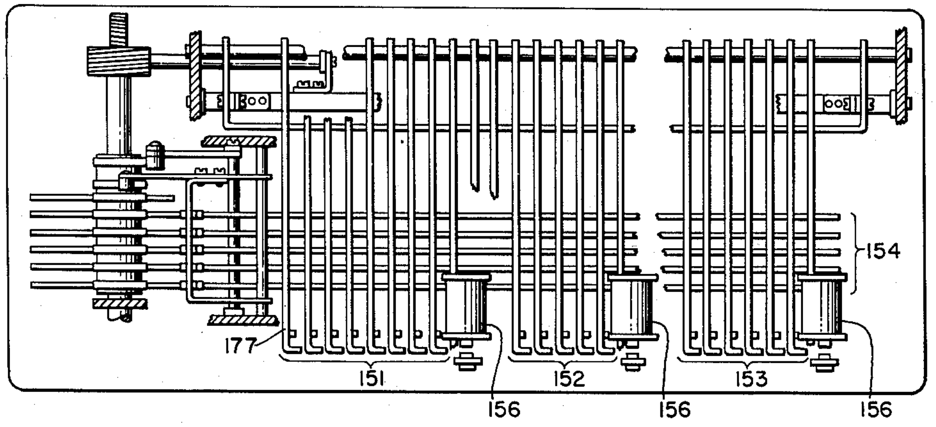
Fig. 7 is a top plan view of an arrangement of a plurality of groups of coded bars embodying an additive feature of the invention; and, Fig. 8 is a circuit diagram illustrating a means for controlling the operation of the embodiment of the invention shown in Fig. 7.
Figure 8:
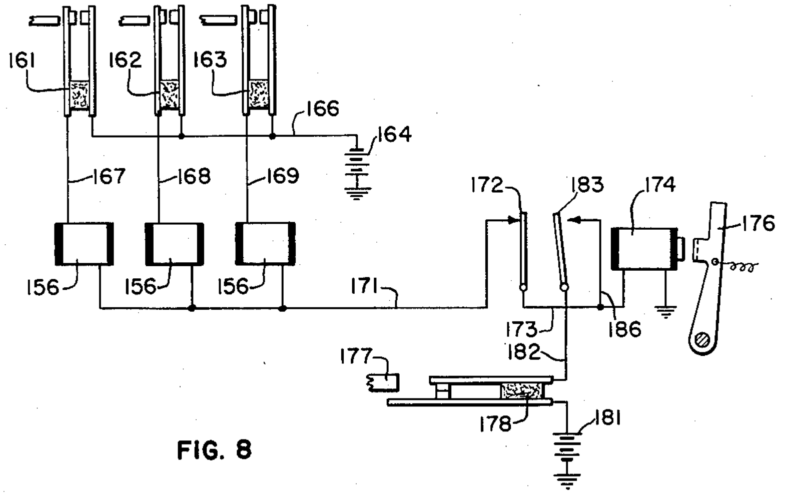

An additional embodiment of the invention is shown in Figs. 7 and 8 wherein a plurality of groups of coded bars 151, 152, and 153 are arranged to control the permutated positions of a series of elongated selector bars 154 which are in fact identical with the selector bars 16 shown in Fig. 1. Each group of coded bars has associated therewith a start solenoid 156. Each of the coded bars within each group has associated therewith a latching arrangement identical to that disclosed with respect to the embodiment shown in Figs. 1 to 6; however, the first multi-armed member of the latching mechanisms associated with the groups 151 and 152 are provided with an elongated bar which is positioned to be engaged by the furcation on the last coded bar in the group 152 to 153, respectively.

The operation of the particular coded bars within each group 151, 152 and 153 is identical with that previously discussed in regard to the embodiment of the invention illustrated in Figs. 1 to 6 and hence need not be repeated at this time since it is believed that a comprehensive understanding of this embodiment of the invention may be obtained by a consideration of the circuit diagram shown in Fig. 8.

Referring now to Fig. 8 there is shown three contacts 161, 162 and 163 which may be selectively closed to energize solenoids 156 associated with each respective group of coded bars 151, 152 and 153. Closure of any of these contacts completes a circuit which may be traced from ground through the battery 164, over a lead 166, through the now closed contact 161 or 162 or 163, over a lead 167 or 168 or 169, through one of the solenoids 156, over a lead 171, through a normally closed armature 172, over a lead 173, through a start solenoid 174 to ground. The start solenoid 174 is identical with the start solenoid 116 shown in Fig. 6. Energization of the start solenoid 174 draws up the armature 176 which is identical to the armature 114 shown in Figs. 5 and 6 and as a result the apparatus is initiated into operation to transmit a series of permutated signals as determined by permutations on the various coded bars. Operation of the last coded bar 177 in group 151 again opens a contact 178 included within a locking circuit for the start solenoid 174. The locking circuit for the start solenoid 174 is identical with the locking circuit for the start magnet 116 shown in Fig. 6, that is, the energization of the start solenoid 174 completes a circuit from ground, through a battery 181, through the normally closed contact 178, over a lead 182, through a now drawn up armature 183, over a lead 186, through the start solenoid 174 to ground. It is to be particularly noted that in this embodiment of the invention the closure of contact 161 will only cause the coded bars within the group 151 to be actuated to control the generation of the signals. The energization of the start solenoid 156 associated with the group of coded bars 152 causes the coded bars within group 152 to be successfully positioned to control the selector bars 154 and upon the exhaustion of the coded bars within the group 152, the coded bars within the group 151 will be successively positioned to control the selector bars 154. In a like manner energization of the start solenoid 156 associated with the group of coded bars 153 successfully positioned the coded bars within the group 153 to control the positions assumed by the selector bar 154 and upon the exhaustion of the coded bars within the group 153, the coded bars within the group 152 are then successively positioned to control the selector bars 154 and finally upon the exhaustion of the coded bars within the group 152 the coded bars within group 151 are successively positioned to control the selector bars 154.

It may be also appreciated that by the simple expedient of providing additional normally closed contacts identical to the contact 178 and connected in series therewith and adapted to be operated by the furcation on the last coded bar in each of the other groups of coded bars 152 and 153 the successive operation of the coded bars will be terminated upon the completion of the generation of signals as determined by the coded bars within one particular group associated with the particular energized start solenoid 156.

It is to be understood that the above described arrangements of apparatus and construction of elemental parts are simply illustrative of the application of the principles of the invention and many other modifications may be made without departing from the spirit and scope of the invention.

What is claimed is:

1. In an automatic telegraph transmitter, a series of pivotally mounted bars, a permutatively arranged series of projections formed on each bar, signal generating means adapted to generate signals in accordance with the permutation of projections on each bar, and cyclically operable means for successively pivoting each succeeding bar into position to control the signal generator to generate permutative signals in accordance with the permutations of projections on each succeeding bar.

2. In a character sequence transmitter, a signal generating means, a plurality of coded bars, means for urging each of the coded bars into position to control the signal generating means, separate means associated with each of said coded bars for independently holding each of said coded bars against the effect of each of the urging means, and means for sequentially releasing each holding means to render effective the urging means associated with each coded bar whereby the coded bars are sequentially moved into position to control said signal generating means.

3. In an automatic telegraph transmitter, a signal generating means, a plurality of movably mounted coded bars adapted to be positioned to control the signal generating means, a latch associated wtih each coded bar for holding each coded bar from the control position, means for successively releasing the latches, and means for moving each successive coded bar into control position after release of its latch.

4. In a character sequence transmitter, a signal generator, a plurality of selector bars, means for periodically reciprocating the selector bars into and out of position to control the signal generator, a plurality of coded bars, each of said coded bars having a permutation of projections thereon, and means for successively positioning succeeding coded bars in position wherein the projections thereon block the movement of a permutation of the selector bars into the signal generator control position.

5. In a character sequence transmitter, a signal generator, a plurality of selector bars, means for urging the selector bars into position to control the signal generator, means for continuously reciprocating the selector bars against the influence of the urging means into and out of the signal generator control position, a plurality of coded bars, and means for moving a coded bar into engagement with the selector bars each time the reciprocating means moves the selector bars out of the signal generator control position whereby a permutation of selector bars as determined by each coded bar are prevented from movement by the urging means.

6. In a character sequence transmitter, a signal generator, a plurality of selector bars, means for urging said selector bars into position to control the signal generator, means for holding said selector bars against the effect of the selector bar urging means, a plurality of coded bars, means for urging the coded bars toward said selector bars, means for holding said coded bars against the effect of the coded bar urging means, means for sequentially rendering ineffective said coded bar holding means to sequentially permit the coded bars to move into engagement with the selector bars, and means for releasing said selector bar holding means following each engagement of a coded bar with the selector bars whereby certain of said selector bars are prevented from movement in accordance with the coded indicia on the coded bar, said moved selector bars controlling the signal generator in accordance with the permutation of moved selector bars.

7. A character sequence transmitter comprising a signal generator, a plurality of selector members, means for urging the selector members into position to control the signal generator, means for holding said selector members against the influence of the selector member urging means, a plurality of coded bars, said coded bars having coded indicia thereon in the form of a permutation of projections, means for urging each of said coded bars into engagement with the selector members, means for holding each of the coded bars against the effect of the coded bar urging means, means for successively rendering effective the urging means associated with each code bar to successively move each coded bar in engagement with the selector members, and means for releasing the selector bar holding means subsequent to each movement of a coded bar into engagement with the selector bars whereby the selector bar members are permutatively moved in accordance with the coded indicia on the coded bars to control the operation of the signal generator, each of said projections on each code bar being effective to block one selector member from movement.

8. In a character sequence transmitter, signal generating means, a series of coded bars, each of said coded bars having a permutation of projections thereon, means for holding the coded bars from said signal generating means, a latch associated with each coded bar, said latches being interposed between said coded bars and signal generating means to prevent the coded bars from moving into engagement with the signal generating means, a cocking means associated with each latch, means on each coded bar for actuating the cocking means associated with the next succeeding coded bar in the series, means for releasing the latching means associated with the first coded bar in the series, and means for oscillating the holding means whereby each oscillation of the holding means successively moves the projections on one of the coded bars in the series into position to control the signal generating means and actuates the next succeeding cocking means in the series.

9. In a character sequence transmitter, signal generating means, a series of movably mounted coded bars, said coded bars being adapted to be positioned to control the signal generating means, means associated with each coded bar for latching the coded bars against movement into the control position, means associated with each latching means adapted to be conditioned to withdraw each latching means from the latching position, means on each coded bar for conditioning the withdrawing means associated with the next succeeding coded bar in the series, means for moving the latching means associated with the first coded bar to permit the first coded bar to move into the control position, and means for periodically moving said coded bars to move the first coded bar then each succeeding coded bar into the control position, each movement of the coded bars being effective to condition the said withdrawing means associated with the next succeeding latching means whereby each latching means is successively withdrawn upon subsequent movement of the coded bars associated with the conditioned latching means.

10. In an automatic telegraph transmitter, a signal generating means, a series of movably mounted coded bars adapted to be positioned to control the signal generating means, a latch associated with each of the coded bars for holding each coded bar from the control position, a resilient means connected to each latch, means on each coded bar for extending the resilient means connected to the latch associated with the next succeeding coded bar in the series, means for releasing the latch associated with the first coded bar in the series, and means for imparting a periodic movement to the coded bars, each of said periodic movements causing a successive coded bar to move into the control position, each movement of a coded bar into the control position acting to extend the resilient means associated with the next successive latch, each of said movements permitting successive latches having extended resilient means to be moved from the latching position.

11. A character sequence transmitter including a signal generator, a plurality of selector bars, means for urging the selector bars into position to control the signal generator, means for retaining said selector bars from said control position, a plurality of coded bars, each of said coded bars having a permutation of projections thereon, means for urging said coded bars into engagement with the selector bars, means for holding the coded bars spaced from said selector bars, means for conditioning a first one of said coded bars for movement, means for oscillating said coded bar holding means whereby said conditioned coded bar moves into engagement with the selector bars during movement of the coded bar holding means in a predetermined direction, means on each of the coded bars for conditioning the next adjacent coded bar for movement, said holding means being effective to successively move each adjacent coded bar into engagement with the selector bars each time said coded bar holding means is oscillated in the aforesaid predetermined direction, and means for releasing the selector bar holding means subsequent to each engagement of a coded bar with the selector bars, said selector bars being blocked from movement in a permutative manner in accordance with the permutation of projections on each code bar whereby the signal generated is adapted to be controlled in accordance with each permutative setting of the selector bars.

12. In an automatic telegraph transmitter, a signal generating means, a series of movably mounted coded bars adapted to be positioned to control the signal generating means, a latching element formed on each coded bar, a latch associated with each coded bar for engaging each latching element to prevent the coded bars from moving into the control position, a resilient means connected to each latch, means on each of the coded bars for extending the resilient means connected to the latch associated with the next succeeding coded bar in the series, means for moving the latch associated with the first coded bar in the series, and means for periodically moving all of the coded bars, each of said periodic movements moving a single coded bar into the control position and all of the remainder of said coded bars into a position wherein the latching elements are engaged by the latches to prevent the movement of the remainder of the coded bars into the control position, each of said movements of a coded bar into the control position effectuating an extension of the resilient means connected to the next succeeding latch whereby subsequent movement of the succeeding latching element from the latching position permits the resilient means therefor to withdraw that latch from the latching position.

13. In a character sequence transmitter, a plurality of selector bars, each of said selector bars having formed therein a series of evenly spaced notches, means for urging the selector bars to move in a predetermined direction, means for restraining said selector bars against said movement in positions whereby the notches are arranged in aligned rows, a series of coded bars, each of said coded bars having a permutation of projections formed thereon, means for urging each of said coded bars into a separate aligned row of notches in the selector bars, means for holding the coded bars against the effect of the coded bar urging means, means for latching each of the coded bars from engagement with the selector bars, means for releasing the latching means associated with a first one of the series of coded bars, means for oscillating said coded bar holding means, said first oscillation causing said first coded bar to move into and out of engagement with the selector bars, means on each of the coded bars for conditioning the latch on the next succeeding coded bar for release upon each movement of a coded bar into engagement with the selector bars whereby the subsequent oscillations of the holding means causes the coded bars to be successively positioned within the successive rows of aligned notches in the selector bars, means for periodically releasing the selector bar restraining means upon each coded bar being positioned with an aligned row of notches, said selector bars being permutatively blocked from advancement by the permutative projections on the coded bars, and a signal generator controlled by the permutative positions assumed by the selector bars.

14. In an automatic telegraph transmitter, a signal generating means, a series of movably mounted coded bars adapted to be moved into position to control the signal generating means, a latching element on each of the coded bars, a first group of latches individually associated with each coded bar for engaging each latching element to prevent movement of the coded bars into the control position, resilient means connected to each one of the latches in the first group, a second group of latches individually associated with each resilient means for latching said resilient means in position to exert a force tending to move said first group of latches out of latching position, means for moving the latch associated with the first coded bar in the series out of the latching position, means on each coded bar for extending the resilient means of the next successive coded bar, means for imparting a periodic movement to said coded bars to cause said coded bars to be successively moved to the control position, each movement of a coded bar to the control position causing the resilient means associated with the next succeeding coded bar to be latched in the extended position, each movement of the coded bars to the initial position withdrawing the latching elements from the first group of latches to permit the extended resilient means to withdraw the latch connected thereto whereby the coded bar associated therewith is moved to the control position upon the next periodic movement of the coded bars, and means on each of the coded bars for releasing its respective latch of the second group whenever the coded bar is moved to the control position.

15. In an automatic telegraph transmitter, a signal generating means, a plurality of groups of coded bars, each group of coded bars comprising a series of coded bars, each of said coded bars having a permutatively arranged series of projections thereon, means for successively moving each coded bar within each series of each group into position to control the signal generating means, and means for successively moving the series of coded bars comprising only one group into the control position.

16. In an automatic telegraph transmitter, a signal generator, a plurality of selector bars adapted to be positioned to control the signal generator, a plurality of groups of coded bars, each of said coded bars having a permutatively arranged series of projections thereon, means for successively moving each coded bar within each group into position to control the position of the selector bars, and selective means associated with each group for initiating the successive movement of the coded bars within that particular group.

17. In an automatic telegraph transmitter, a signal generating means, a plurality of groups of coded bars, each group comprising a series of separate coded bars, means for successively moving each coded bar of each group into position to control the signal generating means, means for latching each coded bar against said movement, means for releasing the latch associated with one coded bar within one group for initiating successive movement of all said series of coded bars in all said groups into the control position, and means for releasing the latch associated with one coded bar in another of said groups for only initiating successive movement of the series of coded bars within that group into the control position.

18. In an automatic telegraph transmitter, a plurality of movably mounted coded bars, each of said coded bars having a permutation of projections formed thereon, a signal generating means, and cyclically operable means for successively moving the bars one at a time into position to control the signal generating means in accordance with the permutation of projections formed on each bar.

19. In an automatic telegraph transmitter, a signal generating means, a plurality of coded bars adapted to control the signal generating means, means for holding all of the coded bars from the signal generating means, a latch associated with each coded bar for holding the associated coded bar from the signal generating means, means for cyclically releasing the holding means, and means for successively releasing the latches to successively position the coded bars to control the signal generating means.

20. In an automatic telegraph transmitter, a signal generating means, a plurality of coded bars, means for cyclically moving the coded bars into position to control the signal generating means, a latch associated with each code bar for precluding the movement of the bars into position to control the signal generating means, means for successively moving the latches from the latching position, a second latch associated with each first latch adapted to hold said first latch from the latching position, and means controlled by the successive movement of the coded bars for successively releasing the second latches to successively restore the first latches to the latching position.

21. In an automatic telegraph transmitter, a series of movably mounted coded bars, individual holding means associated with each coded bar, means for releasing the holding means associated with the first of the series of coded bars, a signal generating means adapted to be controlled by the coded bars, means for simultaneously initiating into operation said signal generating means and actuating the releasing means associated with the first coded bar, and means controlled by the first coded bar for initiating the successive release of the other holding means.

22. In an automatic telegraph transmitter, a signal generating means, a series of movably mounted coded bars adapted to control the signal generating means, means for simultaneously initiating into operation said signal generating means and the successive movement of said series of coded bars one at a time into position to control the signal generator, and means controlled by the movement of the last of said series of coded bars into position to control the signal generating means for disrupting the operation of said signal generating means.

23. In an automatic telegraph transmitter, a signal generating means, a main shaft for controlling the signal generating means, a clutch adapted to connect the main shaft to a power source, a series of movably mounted coded bars adapted to control the signal generating means, means associated with each coded bar for holding the coded bars from position to control the signal generating means, individual means for releasing the holding means associated with each coded bar, means for successively actuating the releasing means one at a time, and means controlled by the last of said series of coded bars for disengaging said clutch to disrupt the operation of the signal generating means.

24. In an automatic telegraph transmitter, a signal generating means, a plurality of groups of coded bars, each group of coded bars comprises a series of movably mounted coded bars, each coded bar having a permutatively arranged series of projections thereon, means for holding all of said bars from said signal generating means, means for successively rendering the holding means associated with each bar ineffective to permit the coded bars to successively move into position to control the signal generating means in accordance with the series of projections thereon, and means for successively rendering the holding means associated with the coded bars within only one group ineffective whereby the signal generator is successively controlled by the permutatively arranged projection on each of the coded bars in that group.

25. In an automatic telegraph transmitter, a plurality of movably mounted bars, a signal generating means, means for urging the bars into position to control the signal generating means, means individual to each bar for holding the bar from the control position, and cyclically operable means for releasing one of said holding means during each cycle of operation thereof whereby successive bars move into position to control the signal generating means.

26. In an automatic telegraph transmitter, a plurality of movably mounted bars, a signal generating means, means for urging each bar into position to control the signal generating means, latch means for holding each bar from the control position, means common to all said bars for retaining said bars from the control position, means for cyclically releasing the retaining means, means for releasing the latch means associated with a first one of said bars, and means actuated by the movement of any of said bars into the control position for conditioning the latch means of the next succeeding bar for release upon a subsequent cyclic operation of said retaining means.

References Cited in the file of this patent

UNITED STATES PATENTS

| | | |
|---|---|---|
| 1,069,627 | Meyer | Aug. 5, 1913 |
| 1,271,600 | Meyer | July 9, 1918 |
| 1,895,718 | Kleinschmidt | Jan. 31, 1933 |
| 1,979,328 | Kenerson | Nov. 6, 1934 |
| 2,032,037 | Auth | Feb. 25, 1936 |
| 2,032,518 | Wheelock | Mar. 3, 1936 |
| 2,677,013 | Zenner | Apr. 17, 1954 |